UNITED STATES PATENT OFFICE.

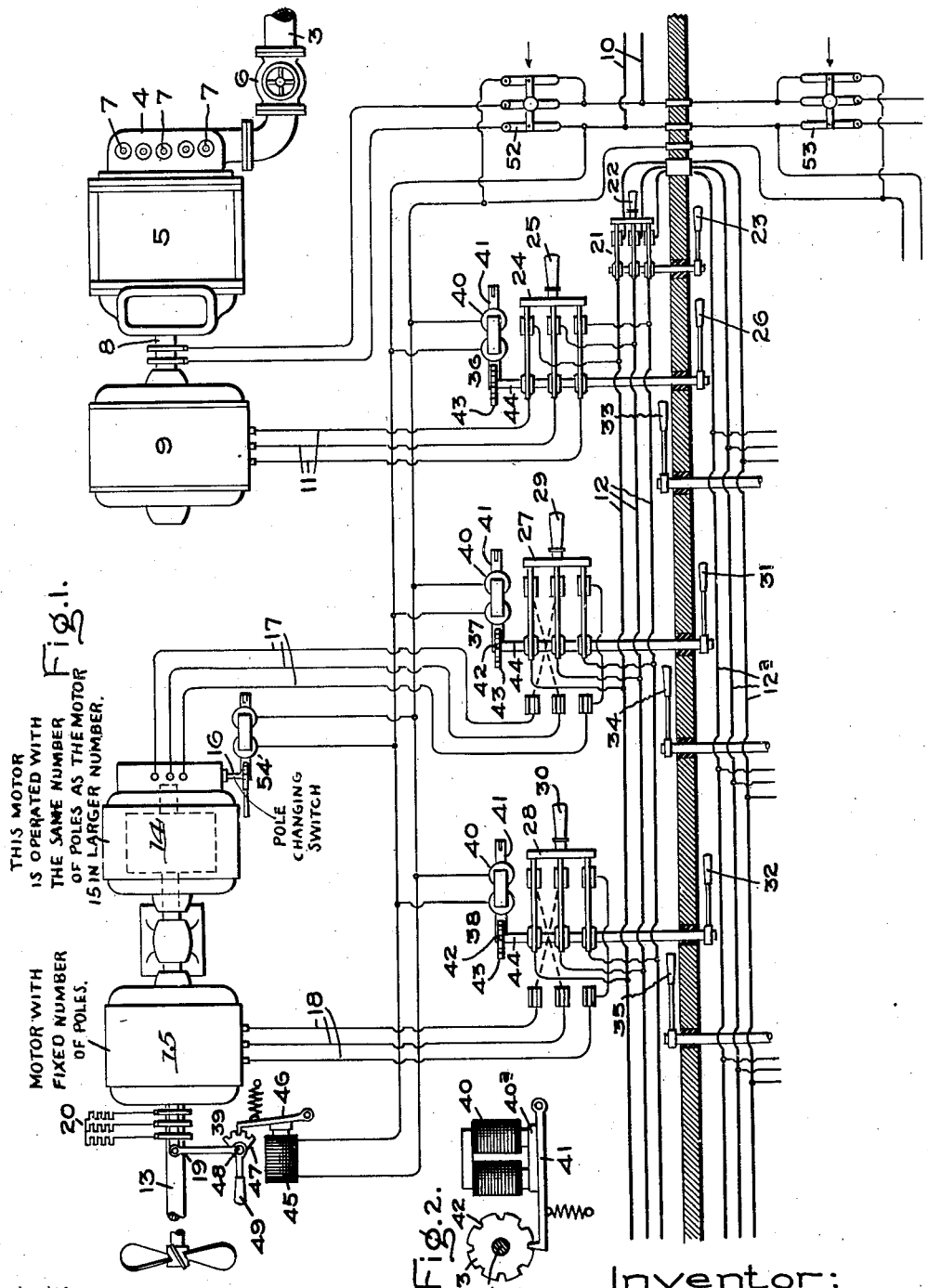

WILLIAM L. R. EMMET, OF SCHENECTADY, NEW YORK, ASSIGNOR TO GENERAL ELECTRIC COMPANY, A CORPORATION OF NEW YORK.

SYSTEM OF SHIP PROPULSION.

1,100,721.        Specification of Letters Patent.        Patented June 23, 1914.

Application filed November 23, 1909. Serial No. 529,577.

*To all whom it may concern:*

Be it known that I, WILLIAM L. R. EMMET, a citizen of the United States, residing at Schenectady, county of Schenectady, State of New York, have invented certain new and useful Improvements in Systems of Ship Propulsion, of which the following is a specification.

The present invention relates to systems of ship propulsion in which the propeller shafts are rotated by electric motors receiving current from generators driven by elastic fluid turbines and in which control devices are provided for maneuvering the ship and propelling it economically at different speeds.

In the illustrated embodiment of the invention two propeller shafts are employed, one on one side of a centrally arranged water-tight bulkhead and the other on the opposite side of said bulkhead. The bulkhead divides a suitable portion of the ship into port and starboard engine rooms having similar power plants arranged in such a manner that the general control of the propelling machinery can be exercised from either engine room. This arrangement of two engine rooms separated by a water-tight bulkhead is especially desirable for warships, but the invention is applicable to other ships with or without bulkheads.

For a consideration of what is novel and my invention reference should be had to the following description and claims.

In the accompanying drawing, Figure 1 is a diagrammatic plan view of the port engine room and a portion of the control mechanism in the starboard engine house, and Fig. 2 is a detail view of a locking device forming part of the control mechanism.

The pipe 3 supplies steam from a boiler plant (not shown) to the steam-chest 4 of the turbine 5. The flow through the pipe 3 is controlled by a valve 6 of any approved design. This valve may be a combined emergency and stop valve, if desired, that can be closed suddenly under certain conditions from either side of the bulkhead. The flow of elastic fluid from the steam-chest 4 into the turbine 5 to drive the rotor thereof can be regulated by a series of nozzle or other valves 7 so as to proportion the supply of energy to the speed and load. The turbine shaft 8 is arranged to drive an alternating current generator 9 of the synchronous type at the relatively high speeds best adapted for efficient operation of the turbine. The generator 9 is excited by direct current supplied by the mains 10 fed from any source available on shipboard, such as the lighting or power circuits of the ship or a generator provided for this purpose. The mains 11 lead the current from the generator 9 to the bus-bars 12.

To secure economical operation at high speeds and also at low speeds, the propeller shaft 13 is provided with two motors 14 and 15, preferably of the induction type, one at least being adapted to operate the propeller shaft alone at low speeds. As shown the motor 14 is built with any suitable arrangement, such as a switch 16, for changing the number of its poles and is equipped with the simplest form of squirrel cage rotor, said rotor being suited for effective operation with either number of poles. Leads 17 connect the motor to the bus-bars 12. The motor 15 has a coil-wound rotor and, as shown, is not arranged for pole-changing, but is permanently connected for the smaller number of poles provided for in the motor 14. The motor 15 is connected to the bus-bars 12 by the leads 18. This motor has a definite winding on its rotor and is provided with a device 19 by which an external resistance 20 can be inserted in the rotor circuit to vary the torque of the motor.

It is desirable to arrange the motor 14 with a pole-changing mechanism and the motor 15 with a fixed number of poles because there may be much complication involved if resistance be inserted in the rotor circuits of a motor in which the number of poles can be changed. If the change is simply in the ratio of 2 to 1, the difficulty is not serious and both motors can be equipped with pole-changers and external resistances so that either motor can be used alone for driving the shaft at low speeds or with high torque, but with almost any other ratio between the different numbers of poles, it is necessary to provide a multiplicity of circuits in the rotor as well as in the stator and such a motor involves many collector rings and other complications which are best avoided.

With the arrangement illustrated either the motor 14 or the motor 15 can be reversed for backing the propeller but the motor 14 having a simple squirrel cage rotor will not be capable of accomplishing reversal in so short a time. By suitably proportioning the external resistance 20, the motor 15 can be made to suddenly exert a very powerful torque ahead or astern and to maintain it for as long a period as may be necessary in the operation of changing the direction of the ship without dangerous accumulation of heat in the motor or generator.

The bus-bars 12 and 12$^a$ are provided with a suitable connecting switch 21 so that they can be operated together or independently as may be desired. This switch 21 is arranged so that it can be operated by a handle 22 in the port engine room or a handle 23 in the starboard engine room. The leads 11 are connected to a switch 24 having an operating handle 25 in the port engine room and a similar handle 26 in the starboard engine room. The leads 17 and 18 have reversing switches 27 and 28 with handles 29 and 30 in the port engine room and handles 31 and 32 in the starboard engine room for operating them. The handles 33, 34 and 35 are connected to switches (not shown), forming part of the starboard power plant that are similar in construction and function to the switches 25, 29 and 30, so that said starboard switches can be operated from the port engine room when necessary. The position of the handles 23, 26, 31, 32, 33, 34 and 35 will also indicate to the men in one engine room the position of the corresponding switches in the engine room on the opposite side of the bulkhead.

Although I have illustrated the switch operating means as being handles to be grasped by the attendant or operator, obviously I am not limited to this specific operating means, as other well known forms arranged for either direct or remote control may be used.

The switches 16, 25, 29 and 30 and the device 19 are equipped with locking devices 54, 36, 37, 38 and 39 arranged to be energized from the exciting circuit 10, the arrangement being such that said switches and devices cannot be operated when the exciting current is on either generator. The structure of the locks 36, 37, 38 and 54 is more fully illustrated in Fig. 2. The interlocking circuit energizes the magnet 40 and by attracting the armature 40$^a$ holds the end of the arm 41 carrying said armature in engagement with one of the notches 42 in a disk 43 fixed on the shaft 44 that carries the switch handles. The same circuit energizes the magnet 45 of the lock 39 and holds the end of the arm 46 in engagement with one of the notches in the edge of the segment 47 secured to the shaft 48 on which the operating handle 49 is mounted. Suitable springs withdraw the ends of the arms 41 and 46 from said notches when the current through the magnets is interrupted Then the switches and the device can be moved to any desired new positions and locked in said positions by closing the circuit. The interlocking mechanism might be connected in other ways to the exciting switches but the electrical arrangement shown is preferable. Switches 52 and 53 are provided for so controlling the exciting and interlocking circuits that the exciting circuits are independent of the interlocking circuit but both are energized by the closing of said switches. It will also be noted that the closure of either exciting switch energizes the interlocking circuit.

In a system of the type illustrated, the switching devices can be made simpler, lighter and more effective if arrangements are provided so that no circuit is interrupted while the current is flowing, and the conditions of ship propulsion are such that this advantage can be secured by means of the above described apparatus without sacrifice of efficiency or facility in maneuvering. The locking devices 36, 37 and 38 prevent the main current carrying switches from being opened or closed while either generator is active. The switches which control said devices are preferably connected by mechanism so arranged that they are controllable from either engine room. If an exciting switch be opened while steam is being admitted to the turbine 5, the electric load will be removed and the turbine will speed up until the excess speed causes an emergency governor or other device to trip the emergency stop valve 6 in a well known manner and shut off the steam supply.

The motor 15 is used in going ahead for high speeds only when the demand for power is great. This motor is also available for use in reversing or in maneuvering ahead or astern where a large torque may be demanded, the introduction of the resistance 20 into the rotor circuit making it available for effective use under such conditions. When operating the ship normally at low speeds, the motor 14 will be used alone with its larger number of poles. At high speeds, the motor 14 arranged for its smaller number of poles will be used with the motor 15 to drive the shaft 13. Under either high speed or low speed conditions it is possible to control each of said speeds within desired limits by simply regulating the steam admission to the turbine 5 so that under any set of conditions the variation of speed with steam admission will be similar to that which would exist if the turbines drove the propellers directly, the electrical apparatus under each of the arrangements acting as a speed-reducing bond between the turbine 5 and the propeller shaft and permitting the turbine and the propeller to be each operated at an efficient speed of rotation.

While the above description relates primarily to the power plant in the port engine room as illustrated in Fig. 1, it is to be understood that the starboard power plant and engine room are duplicates of those illustrated. A particular description of the starboard apparatus is therefore unnecessary, the connections between the two plants being clearly shown in Fig. 1. With two plants of the sort disclosed, it is possible to operate the generators and motors on either side of the ship separately or to operate the two sets of generators and motors in parallel. It will generally be desirable to operate the two sets in parallel since by so doing the propellers will always rotate at approximately the same speed without being affected by changes in their depth of submersion due to rolling. It will also be possible to operate any one or more motors on either side from either of the generators by suitably manipulating the switches, or to go ahead or back with any generator and motors which might be available in the event of damage to other parts of the apparatus. When cruising at low or moderate speeds, economy of operation can be secured by operating one generator only to supply current to a motor or motors on each side of the ship. Hence it is desirable to have the apparatus arranged so that the men in one engine room can know what changes in arrangement or connection of said apparatus are being made by those in the other engine room and thus the general control of the propelling machinery be exercised from either room. Where it is possible and convenient to do so, the mechanism for moving the switches is arranged as illustrated so that it extends through the bulkhead and can be operated from either engine room. Any changes of connections, movements or adjustments which cannot be made through the bulkhead by such means can be directed by signal and performed by the man or men in the opposite room.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In combination, an alternating current generator, means for driving it, a source supplying current to excite the generator, a shaft, two motors for driving the shaft, circuits connecting the generator and the motors, switches in the circuits for controlling the operation of the motors, and locking means for the switches that are energized from said source of exciting current and prevent the manipulation of the switches while the generator is excited.

2. In combination, an alternating current generator, means for driving it, a source supplying current to excite said generator, a shaft, motors for driving the shaft, circuits connecting the generator and the motors, switches in said circuits for controlling the operation of the motors, and locking devices for said switches that are energized from said source of exciting current and prevent the manipulation of the switches while the generator is excited.

3. In combination, a synchronous alternating current generator, means for driving it, a source supplying current to excite the generator, a shaft, a motor connected to the shaft, an induction motor, a resistance, means for controlling the introduction of the resistance into the rotor circuit of said induction motor to vary the torque of the motor, cricuits connecting the generator and the motors, switches in the circuits for controlling the operation of the motors, and locking devices for said means and said switches that are energized from said source of exciting current and prevent their manipulation while the exciting current is on and the generator is active.

4. In a ship propulsion system, the combination of two similar power plants arranged in separate engine rooms and driving separate propeller shafts, each of said plants including a turbo-generator, motors receiving current from the generator and driving the propeller shaft, circuits connecting the generator and the motors, and controlling devices in the circuits for operating the motors singly or together to drive the shaft, with means for actuating said devices from either engine room.

5. In a ship propulsion system, the combination of two similar power plants driving separate propeller shafts, each of said plants including an alternating current generator, means for driving it, induction motors for driving the shaft, bus-bars, leads connecting the generators and motors of both plants with said bus-bars, and switches controlling said leads which are arranged to be so manipulated that the two plants can be operated in parallel or one or more motors of each set or both sets can be driven from either generator.

6. In a ship propulsion system, the combination of two similar power plants arranged in separate engine rooms and driving separate propeller shafts, each of said plants including an alternating current generator, means for driving it, and motors for driving the shaft, bus-bars for each of the two plants, means connecting said bus-bars, leads connecting the generators and motors of both plants with the bus-bars, switches controlling said leads, and means for operating said switches from either engine room.

7. In a ship propulsion system, the combination of two similar power plants arranged in separate engine rooms and driving separate propeller shafts, each of said plants including an alternating current generator, means for driving it, a source of exciting current for the generator, and motors for driving the shaft, at least one of said motors having a pole-changing switch, bus-bars, leads connecting the generators and motors of both plants to the bus-bars, leads connecting the generators with the source of exciting current, switches controlling said exciting leads, main switches controlling the first mentioned leads, means for operating said main switches from either engine room, and electric locking devices for the main and pole-changing switches that are arranged to be energized from the source of exciting current so that said switches cannot be manipulated so long as the exciting current is on and either or both generators are active.

8. In a ship propulsion system, the combination of two similar power plants arranged in separate engine rooms and driving separate propeller shafts, each of said plants including an alternating current generator, means for driving it, and two motors for driving the shaft, bus-bars, leads connecting the generators and motors of both plants to the bus-bars, switches controlling said leads, and means for operating said switches from either engine room.

9. In a ship propulsion system, the combination of two similar power plants arranged in separate engine rooms and driving separate propeller shafts, each of said plants including an alternating current generator, means for driving it, means for supplying current to excite the generator, motors for driving the propeller shaft, circuits connecting the generator and the motors, and switches in said circuits for controlling the operation of the motors, with means for locking the switches of both plants when either or both generators are excited.

10. In a ship propulsion system, the combination of two similar power plants arranged in separate engine rooms and driving separate propeller shafts, each of said plants including an alternating current generator, means for driving it, a source of current for exciting the generator, motors for driving the propeller shaft, circuits connecting the generator and the motors, and switches in said circuits for controlling the operation of the motors, with means energized from the source of the exciting current for locking the switches of both plants when either or both generators are excited, circuits connecting the source of exciting current to the generators and the locking devices, and switches for controlling each exciting circuit which are so arranged that the interlocking circuit is also controlled by either of said exciting switches.

11. In a ship propulsion system, the combination of a propeller shaft, motors for driving the shaft, an alternating current generator for supplying current to the motors, means supplying current to excite the generator, switch means in the leads connecting the generator and the motors, a pole-changing switch for one at least of the motors, resistance means, a device for controlling the insertion of said resistance means into the windings of one of the motors, and means for locking said switch means, switch and device while the generator is excited.

In witness whereof, I have hereunto set my hand this 22nd day of November, 1909.

WILLIAM L. R. EMMET.

Witnesses:
BENJAMIN B. HULL,
HELEN ORFORD.